(12) United States Patent
Wong et al.

(10) Patent No.: US 9,722,298 B2
(45) Date of Patent: Aug. 1, 2017

(54) MOBILE WIRELESS COMMUNICATIONS DEVICE WITH MULTIPLE-BAND ANTENNA AND RELATED METHODS

(71) Applicant: RESEARCH IN MOTION LIMITED, Waterloo (CA)

(72) Inventors: Joshua Kwan Ho Wong, Waterloo (CA); Adrian Matthew Cooke, Kitchener (CA); Zhong Yi Loy, Kitchener (CA); Mun Soo Bae, Waterloo (CA)

(73) Assignee: BlackBerry Limited, Waterloo (CA)

( * ) Notice: Subject to any disclaimer, the term of this patent is extended or adjusted under 35 U.S.C. 154(b) by 666 days.

(21) Appl. No.: 13/660,233

(22) Filed: Oct. 25, 2012

(65) Prior Publication Data

US 2014/0120991 A1 May 1, 2014

(51) Int. Cl.
| | |
|---|---|
| H01Q 1/24 | (2006.01) |
| H01Q 5/35 | (2015.01) |
| H01Q 5/378 | (2015.01) |
| H01Q 21/28 | (2006.01) |
| H01Q 9/42 | (2006.01) |
| H04M 1/02 | (2006.01) |

(52) U.S. Cl.
CPC ............... *H01Q 1/243* (2013.01); *H01Q 5/35* (2015.01); *H01Q 5/378* (2015.01); *H01Q 9/42* (2013.01); *H01Q 21/28* (2013.01); *H04M 1/0202* (2013.01)

(58) Field of Classification Search
CPC .... H01Q 25/001; H01Q 25/005; H01Q 1/243; H01Q 5/35; H01Q 5/378; H01Q 21/28; H01Q 9/42; H03B 211/00; H04B 5/0018; H04B 7/00; H04M 1/0202

USPC ............................................ 455/575.1, 575.5
See application file for complete search history.

(56) References Cited

U.S. PATENT DOCUMENTS

| | | | |
|---|---|---|---|
| 6,292,144 B1 * | 9/2001 | Taflove | H01Q 1/24 343/700 MS |
| 6,903,686 B2 * | 6/2005 | Vance | H01Q 1/243 343/700 MS |
| 7,834,809 B2 | 11/2010 | Tseng et al. | |
| 7,973,725 B2 | 7/2011 | Qi et al. | |

(Continued)

FOREIGN PATENT DOCUMENTS

| | | |
|---|---|---|
| EP | 1304765 A2 | 4/2003 |
| WO | 2011067944 A1 | 6/2011 |

*Primary Examiner* — Joseph Dean, Jr.
(74) *Attorney, Agent, or Firm* — Guntin & Gust, PLC; Atanu Das

(57) ABSTRACT

A mobile wireless communications device may include a housing, a wireless transceiver carried by the housing and having a primary output, and a secondary output, and a multiple-band antenna carried by the housing and coupled to the wireless transceiver. The multiple-band antenna may include a dielectric substrate and a pattern of electrically conductive traces thereon defining a primary radiator and a secondary radiator spaced apart from the primary radiator. The primary radiator may include a first elongate member having a primary feed coupled to the primary output, and a first reference member spaced from the first elongate member and at least partially laterally surrounding the first elongate member and coupled to a reference voltage. The secondary radiator may include a second elongate member having a secondary feed coupled to the secondary output.

20 Claims, 9 Drawing Sheets

(56) References Cited

U.S. PATENT DOCUMENTS

| | | |
|---|---|---|
| 2004/0137950 A1 | 7/2004 | Bolin et al. |
| 2006/0145924 A1* | 7/2006 | Chen ...................... H01Q 1/243 343/700 MS |
| 2006/0293078 A1* | 12/2006 | Qi ......................... H01Q 1/243 455/552.1 |
| 2008/0165063 A1 | 7/2008 | Schlub et al. |
| 2008/0204340 A1* | 8/2008 | Kim ...................... H01Q 1/243 343/770 |
| 2009/0224991 A1 | 9/2009 | Rowson et al. |
| 2009/0231200 A1 | 9/2009 | Chiu et al. |
| 2009/0278750 A1 | 11/2009 | Man et al. |
| 2012/0013511 A1 | 1/2012 | Sumi et al. |
| 2012/0120826 A1* | 5/2012 | Hao ...................... H04L 5/0048 370/252 |

\* cited by examiner

MOBILE WIRELESS COMMUNICATIONS DEVICE WITH MULTIPLE-BAND ANTENNA AND RELATED METHODS

TECHNICAL FIELD

The present invention relates to the field of communications, and, more particularly, to wireless communications and related methods.

BACKGROUND

Cellular communication systems continue to grow in popularity and have become an integral part of both personal and business communications. Cellular telephones allow users to place and receive phone calls almost anywhere they travel. Moreover, as cellular telephone technology is improved, so too has the functionality of cellular devices. For example, many cellular devices now incorporate Personal Digital Assistant (PDA) features such as calendars, address books, task lists, calculators, memo and writing programs, etc. These multi-function devices usually allow users to wirelessly send and receive electronic mail (email) messages and access the Internet via a cellular network and/or a wireless local area network (WLAN), for example.

As the functionality of cellular devices continues to increase, so too does demand for smaller devices that are easier and more convenient for users to carry. Nevertheless, the move towards multi-functional devices makes miniaturization more difficult as the requisite number of installed components increases. Indeed, the typical cellular device may include several antennas, for example, a cellular antenna, a global positioning system antenna, and a WiFi IEEE 802.11g antenna. These antennas may comprise external antennas and internal antennas.

Generally speaking, internal antennas allow cellular devices to have a smaller footprint. Moreover, they are also preferred over external antennas for mechanical and ergonomic reasons. Internal antennas are also protected by the cellular device's housing and therefore tend to be more durable than external antennas. External antennas may be cumbersome and may make the cellular device difficult to use, particularly in limited-space environments. Yet, one potential drawback of typical internal antennas is that they are in relatively close proximity to the user's head when the cellular device is in use, thereby increasing the specific absorption rate (SAR). Yet more, hearing aid compatibility (HAC) may also be affected negatively. Also, other components within the cellular device may cause interference with or may be interfered by the internal antenna.

DETAILED DESCRIPTION OF THE PREFERRED EMBODIMENTS

Figure 1:
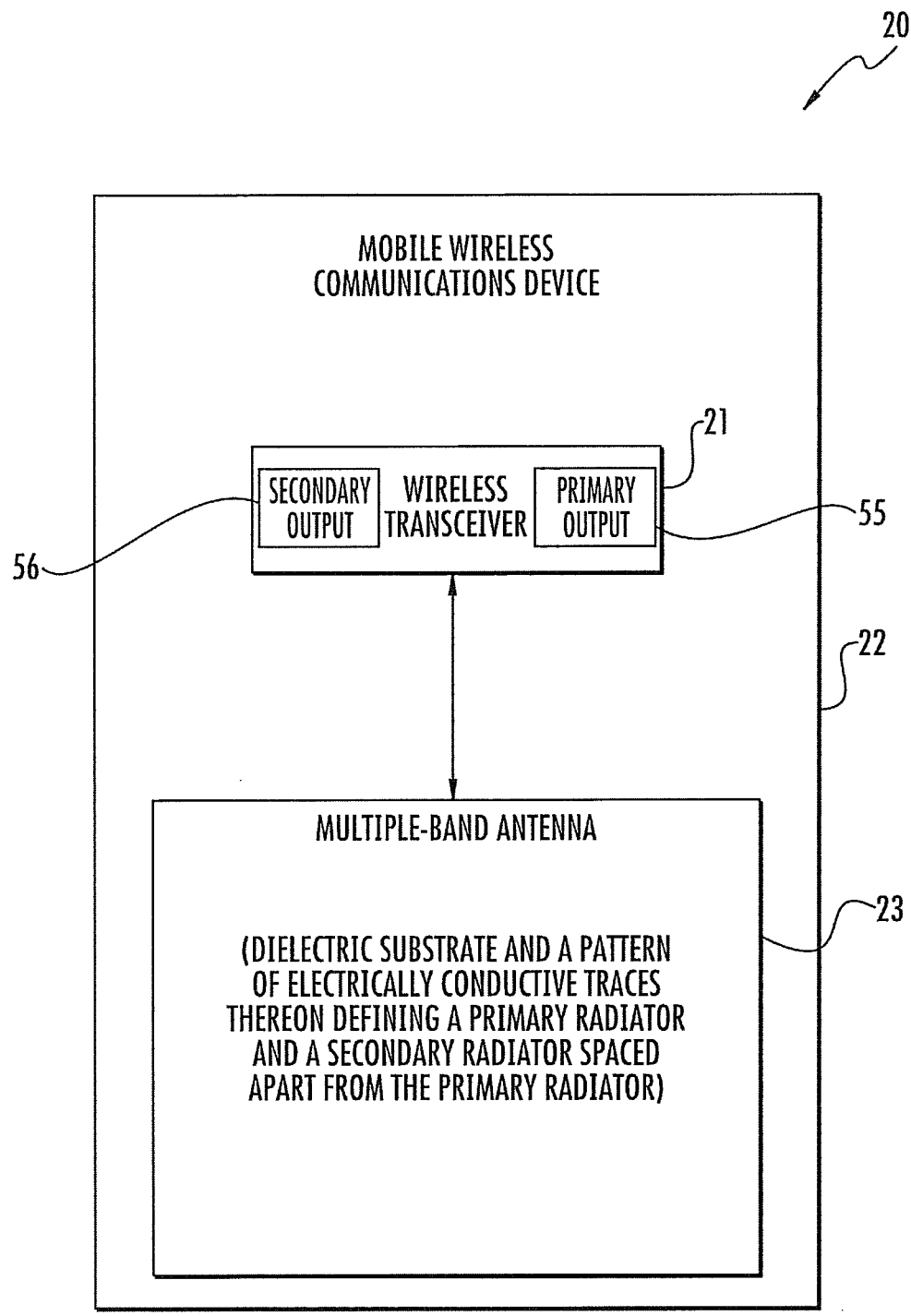
FIG. 1 is a schematic diagram of an example embodiment of the mobile wireless communications device.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternative embodiments.

Generally speaking, a mobile wireless communications device may include a housing, at least one wireless transceiver carried by the housing and having a primary output, and a secondary output, and a multiple-band antenna carried by the housing and coupled to the at least one wireless transceiver. The multiple-band antenna may include a dielectric substrate and a pattern of electrically conductive traces thereon defining a primary radiator and a secondary radiator spaced apart from the primary radiator. The primary radiator may include a first elongate member having a primary feed coupled to the primary output, and a first reference member spaced from the first elongate member and at least partially laterally surrounding the first elongate member and coupled to a reference voltage. The secondary radiator may include a second elongate member having a secondary feed coupled to the secondary output.

More specifically, the first reference member may comprise a first arm, and a second arm coupled thereto. The first arm may have an L-shape, and the second arm may comprise a proximal portion coupled to the first arm and having an L-shape, and a distal portion extending away from the proximal portion.

Additionally, the first arm may extend along a bottom of the housing. The second elongate member may have a first arm, and a second arm coupled thereto. The secondary feed may be on the second arm, and the first arm may extend at least partially along a bottom edge of the housing. The dielectric substrate may have a non-planar shape. The dielectric substrate may be carried by a bottom of the housing, and the primary and secondary radiators may be carried by respective opposing first and second sides of the dielectric substrate. For example, the at least one wireless transceiver may comprise a Long Term Evolution (LTE) transceiver configured to operate the primary and secondary outputs in an LTE carrier aggregation mode.

Another aspect is directed to a method of making a multiple-band antenna for a mobile wireless communications. The method may comprise forming a multiple-band antenna to comprise a dielectric substrate and a pattern of electrically conductive traces thereon defining a primary radiator and a secondary radiator spaced apart from the primary radiator. The primary radiator may comprise a first elongate member having a primary feed coupled to the primary output, and a first reference member spaced from the first elongate member and at least partially laterally surrounding the first elongate member and coupled to a reference voltage. The secondary radiator may comprise a second elongate member having a secondary feed coupled to the secondary output.

Figure 2:
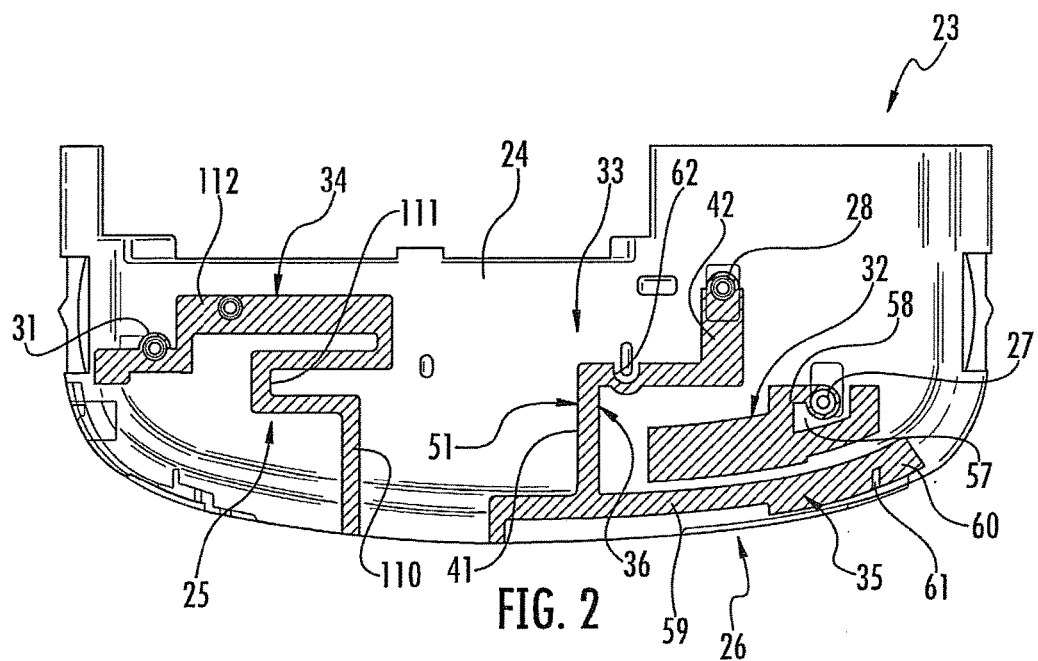
FIG. 2 is a top plan view of an example embodiment of a multiple-band antenna from the mobile wireless communications device of FIG. 1.
Figure 3:
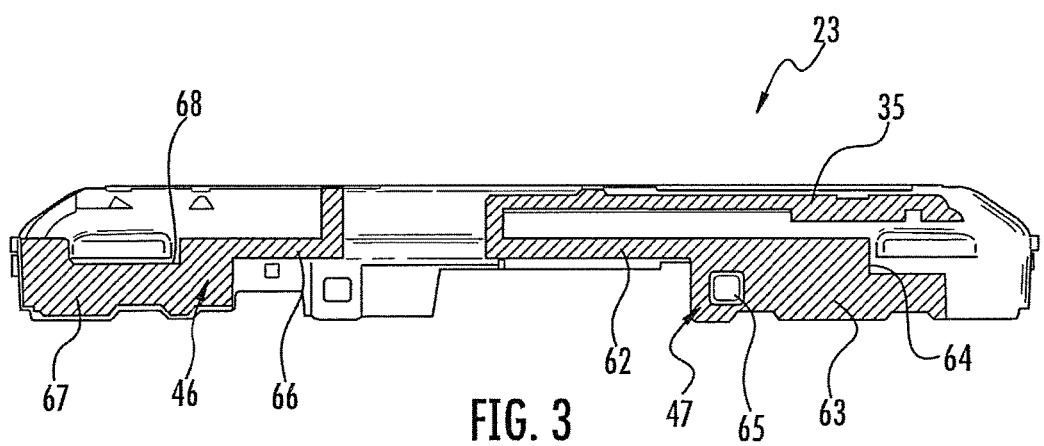
FIG. 3 is a side elevation view of the multiple-band antenna of FIG. 2.

Referring initially to FIGS. 1-3, a mobile wireless communications device 20 according to the present disclosure is now described. The mobile wireless communications device 20 illustratively includes a housing 22, a wireless transceiver 21 carried by the housing and having a primary and secondary outputs 55, 56, and a multiple-band antenna 23 carried by the housing and coupled to the wireless transceiver. For example, the wireless transceiver 21 may comprise an LTE transceiver configured to operate the primary and secondary outputs 55, 56 in an LTE carrier aggregation mode. In the illustrated embodiment, the multi-band antenna 23 may operate the primary output 55 at: LTE Band 7, 3, 8, 20, Primary; Wideband Code Division Multiple Access (WCDMA) Band 1, 2, 5, 8, Primary; Global System for Mobile Communications (GSM) 850, 900, 1800, 1900; and operate the secondary output 56 at LTE Band 7, 3, 8, 20, Multiple Input Multiple Output (MIMO); WCDMA Band 1, 2, 5, 8 Diversity.

The multiple-band antenna 23 illustratively includes a dielectric substrate 24 and a pattern of electrically conductive traces thereon defining a primary radiator 26 and a secondary radiator 25 spaced apart from the primary radiator. The dielectric substrate 24 illustratively includes a non-planar shape, which illustratively fits the interior portions of the housing 22. The dielectric substrate 24 may be carried by a bottom of the housing 22, and the primary and secondary radiators 26, 25 may be carried by respective opposing first and second sides of the dielectric substrate.

The primary radiator 26 illustratively includes a first elongate member 32 having a primary feed 27 coupled to the primary output 55. The primary radiator 26 illustratively includes a first reference member 33 (e.g. ground reference member) spaced from the first elongate member 32 and at least partially laterally surrounding the first elongate member and coupled to a reference voltage (e.g. ground). The secondary radiator 25 illustratively includes a second elongate member having a secondary feed 31 coupled to the secondary output 56. More specifically, the first reference member 33 illustratively includes a first arm 35, and a second arm 51 coupled thereto.

In detail, the first elongate member 32 has a substantially rectangular-shape, and extends in parallel with the first arm 35 of the first reference member 33 (bending upward slightly). The first elongate member 32 illustratively includes a top portion defining a recess 57, and a protruding portion 58 partially extending across the recess and including the primary feed 27.

The first arm 35 of the first reference member 33 is substantially rectangle-shaped, and illustratively includes a proximal portion 59, and a distal portion 60 coupled thereto and having an enlarged width. The distal portion 60 also defines a notch 61 having parallel sides, and a curved end. Additionally, the first arm 35 extends along a bottom of the housing 22.

The second arm 51 comprises a proximal portion 41 coupled to the first arm 35 and having an L-shape, and a distal portion 42 extending away from the proximal portion and having a rectangular-shape. The distal portion 42 illustratively includes a reference connection 28 (e.g. ground connection), and defines a recess 62 having a curved end. The proximal and distal portions 41, 42 have straight sides.

The first reference member 33 illustratively includes a third arm 47 extending almost entirely across the bottom edge of the dielectric substrate 24. The third arm 47 illustratively includes a proximal portion 62, and a distal portion 63 coupled thereto. The proximal portion 62 is rectangle-shaped, and the distal portion 63 is also rectangle-shaped. The distal portion 63 illustratively includes a greater width than that of the proximal portion 62 and has a rectangle-shaped notch 64 adjacent a corner thereof. The distal portion 63 also illustratively defines a square-shaped opening 65.

The second elongate member illustratively includes a first arm 46, and a second arm 34 coupled thereto. The secondary feed 31 illustratively is on the second arm 34, and the first arm 46 may extend at least partially along a bottom edge of the housing 22. In particular, the first arm 46 illustratively includes rectangle-shaped proximal and distal portions 66, 67, the distal portion defining a rectangle-shaped recess 68 on a side thereof. The second arm 34 illustratively includes a proximal portion 110, a medial portion 111 coupled to the proximal portion, and a distal portion 112 coupled to the medial portion. The proximal portion 110 is rectangle-shaped, and the medial portion 111 is U-shaped. The distal portion 112 comprises an L-shaped portion coupled to the medial portion 111, and a rectangle-shaped portion coupled to the L-shaped portion.

Another aspect is directed to a method of making a multiple-band antenna 23 for a mobile wireless communications 20. The method may comprise forming a multiple-band antenna 23 to comprise a dielectric substrate 24 and a pattern of electrically conductive traces thereon defining a primary radiator 26 and a secondary radiator 25 spaced apart from the primary radiator. The primary radiator 26 may comprise a first elongate member having a primary feed 27 coupled to the primary output, and a first reference member 33 spaced from the first elongate member and at least partially laterally surrounding the first elongate member and coupled to a reference voltage. The secondary radiator 25 may comprise a second elongate member having a secondary feed 31 coupled to the secondary output.

Figure 4:
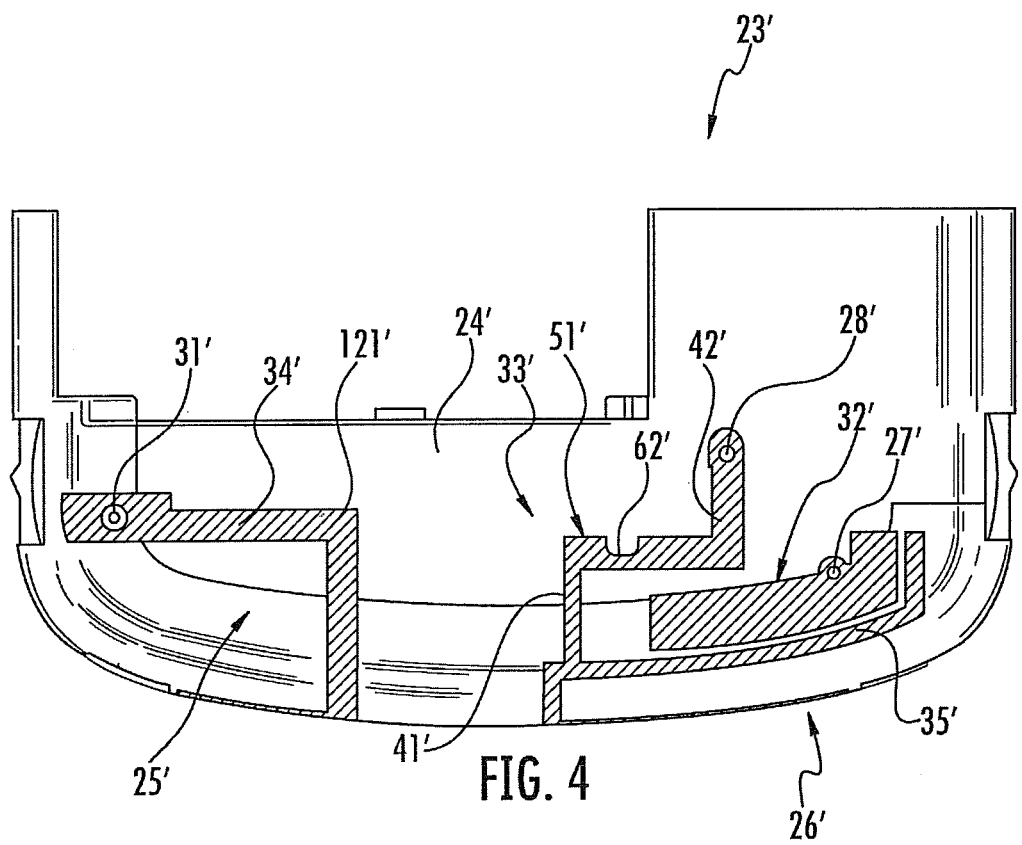
FIG. 4 is a top plan view of another example embodiment of a multiple-band antenna from the mobile wireless communications device of FIG. 1.
Figure 5:
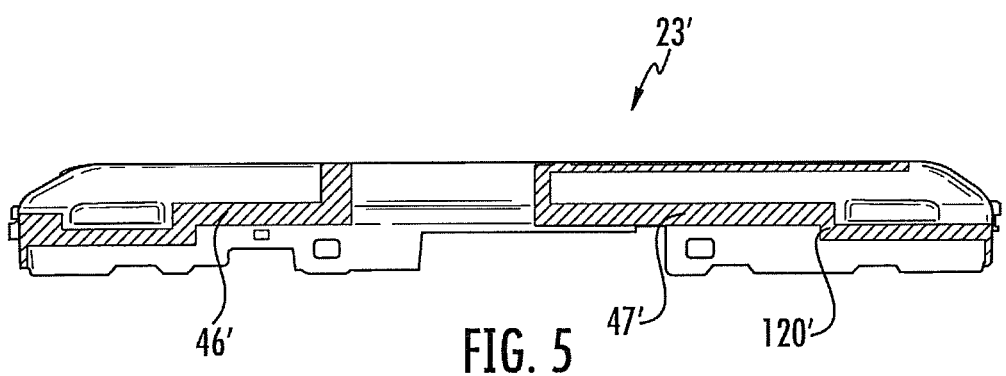
FIG. 5 is a side elevation view of the multiple-band antenna of FIG. 4.

Referring now additionally to FIGS. 4-5, another embodiment of the multiple-band antenna 23' is now described. In this embodiment of the multiple-band antenna 23', those elements already discussed above with respect to FIGS. 1-3 are given prime notation and most require no further discussion herein. This embodiment differs from the previous embodiment in that the first arm 35' illustratively has an L-shape, and uniform width throughout. The first arm 35' also does not include the recess from the embodiments of FIGS. 2-3. The third arm 47' also does not include the notch of the prior embodiment, but does include an L-shaped turn 120' in a medial portion thereof. The second arm 34' of the secondary radiator 25' illustratively includes a single L-shaped turn 121', rather the multiple turns of the prior embodiments. In the illustrated embodiment, the multi-band antenna 23' may operate the primary output 55' at: LTE Band 4, 13 Primary; CDMA 1× Voice, EVDO Diversity; WCDMA Band 1, 2, 5, 8 Primary; GSM 850, 900, 1800, 1900; and operate the secondary output 56' at: LTE Band 13 MIMO; CDMA 1× Voice Primary; and CDMA 1×EVDO Diversity.

Figure 6:
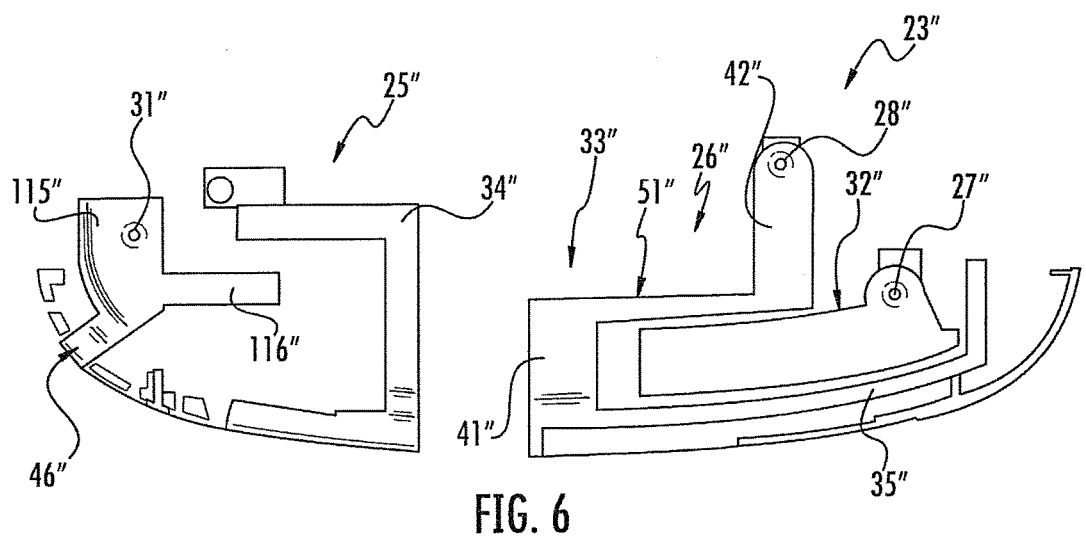
FIG. 6 is a top plan view of yet another example embodiment of a multiple-band antenna from the mobile wireless communications device of FIG. 1 with the dielectric substrate removed.
Figure 7:
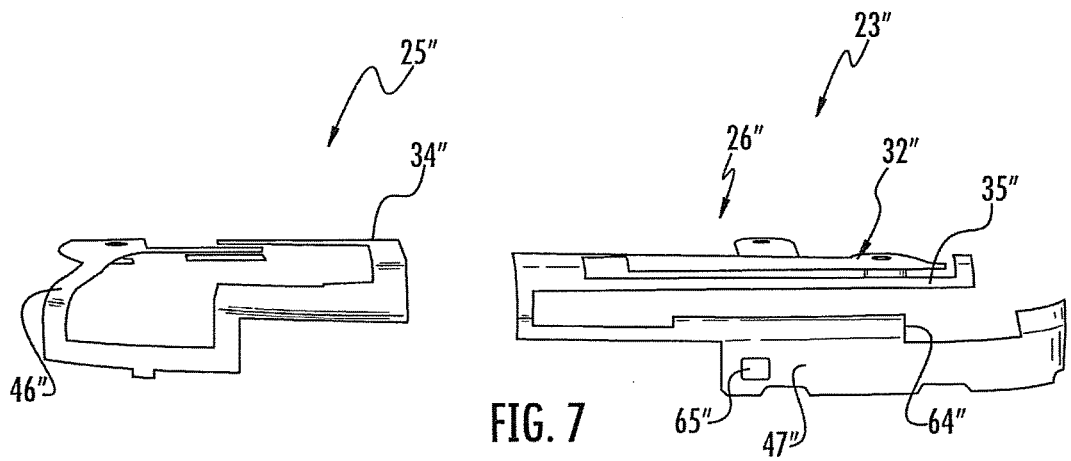
FIG. 7 is a side elevation view of the multiple-band antenna of FIG. 6.
Figure 8:
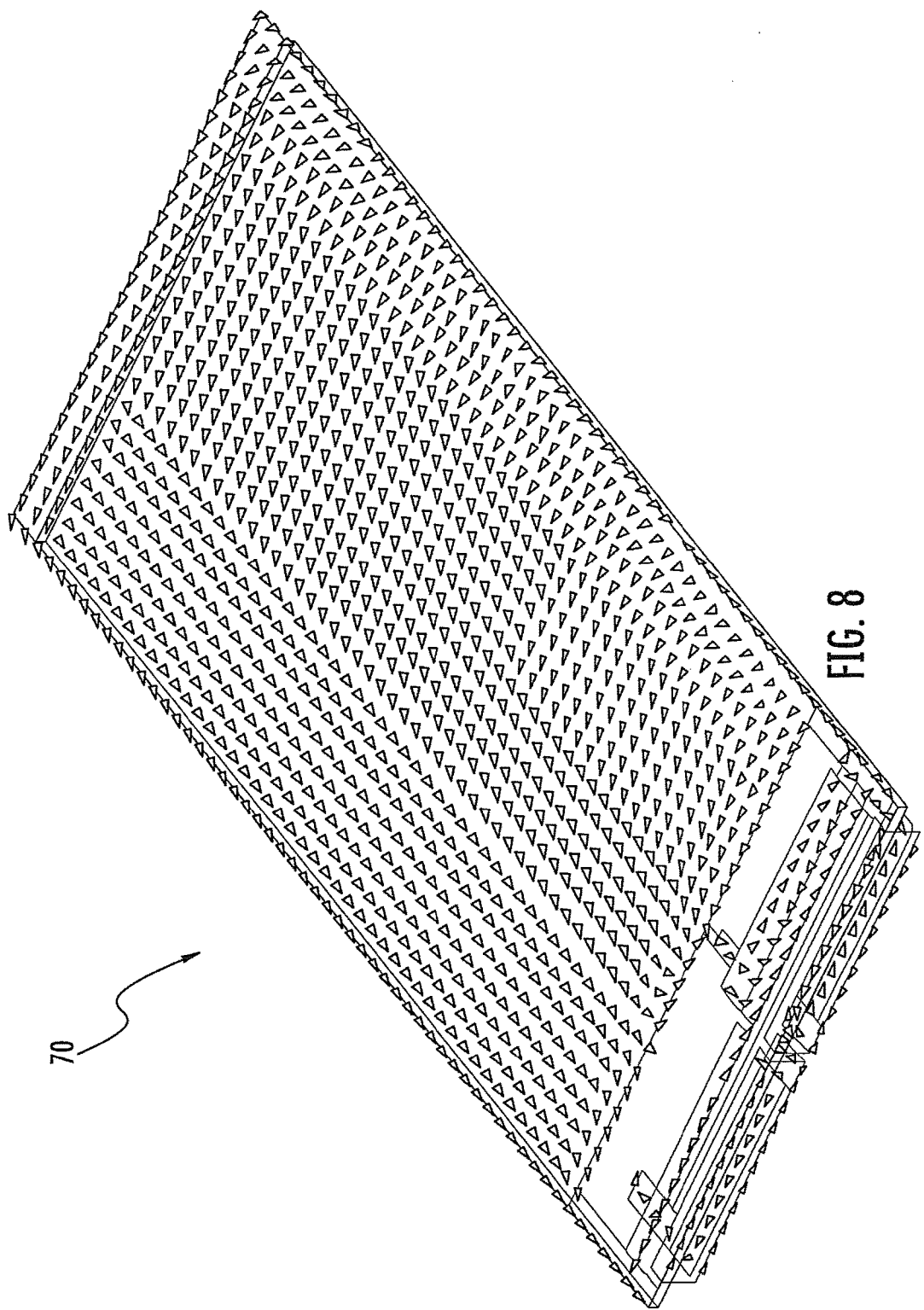
FIG. 8 is a current distribution diagram of an example embodiment of a secondary radiator in an antenna that excites mode 3.
Figure 9A:
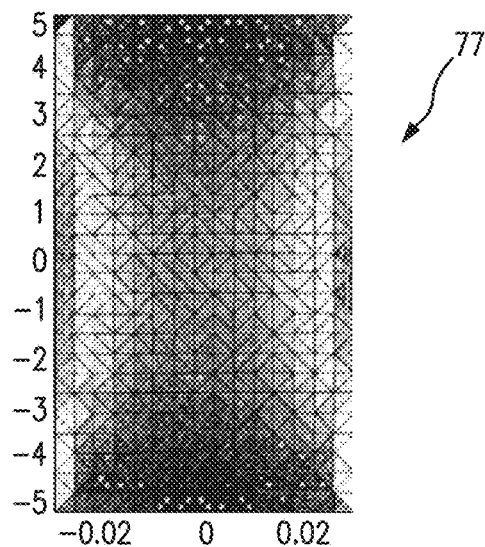
FIG. 9A is a current distribution diagram of an example embodiment of a primary radiator in the mobile wireless communications device in a first mode.
Figure 9B:
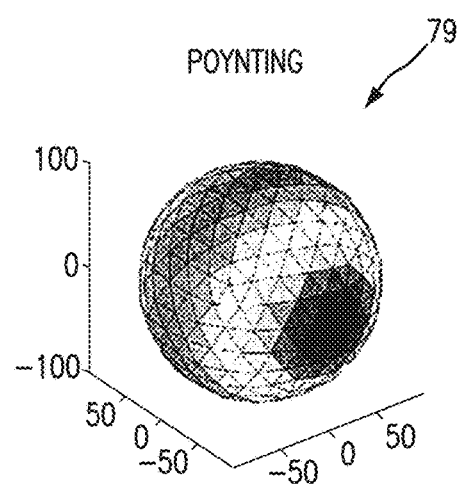
FIGS. 9B-9D are far field patterns of an example embodiment of a primary radiator in the mobile wireless communications device in a first mode.
Figure 9C:
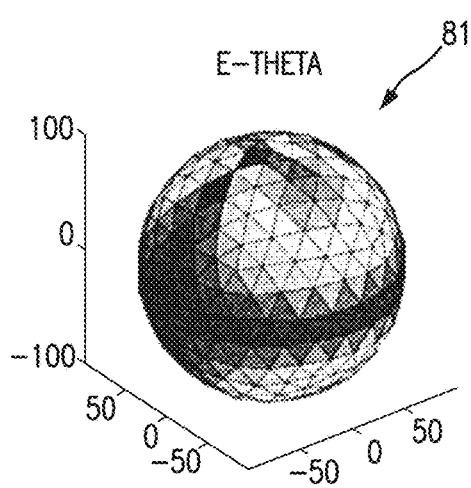
Figure 9D:
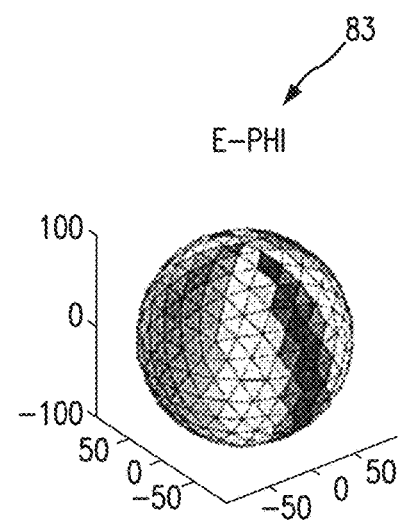
Figure 10A:
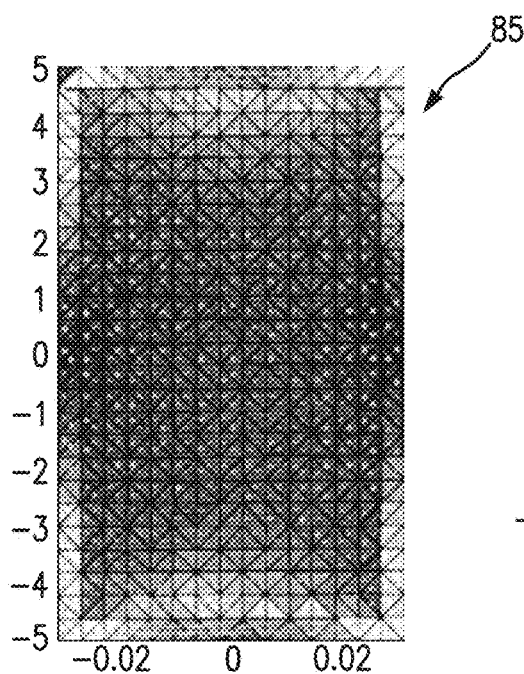
FIG. 10A is a current distribution diagram of an example embodiment of a primary radiator in the mobile wireless communications device in a second mode.
Figure 10B:
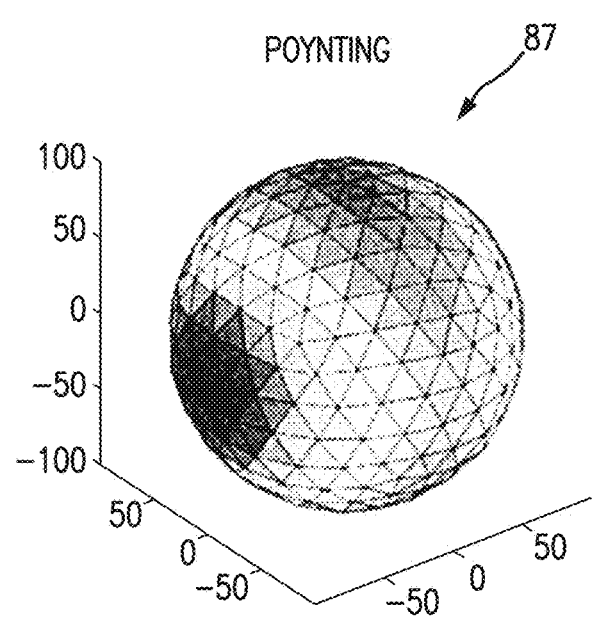
FIGS. 10B-10D are far field patterns of an example embodiment of a primary radiator in the mobile wireless communications device in a second mode.
Figure 10C:
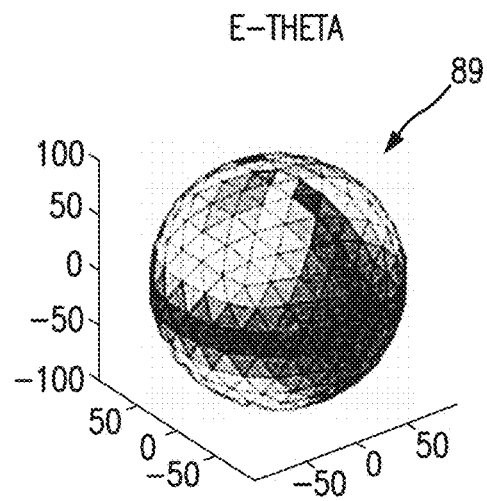
Figure 10D:
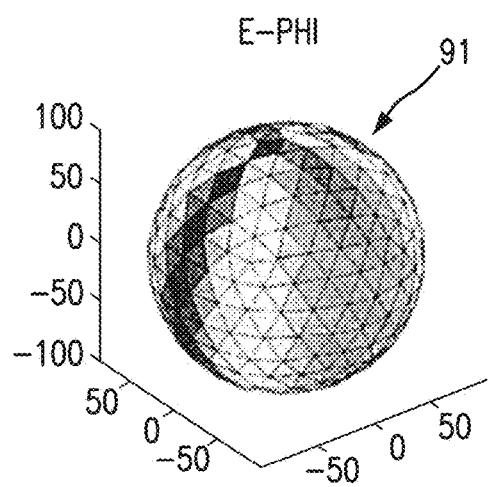
Figure 11A:
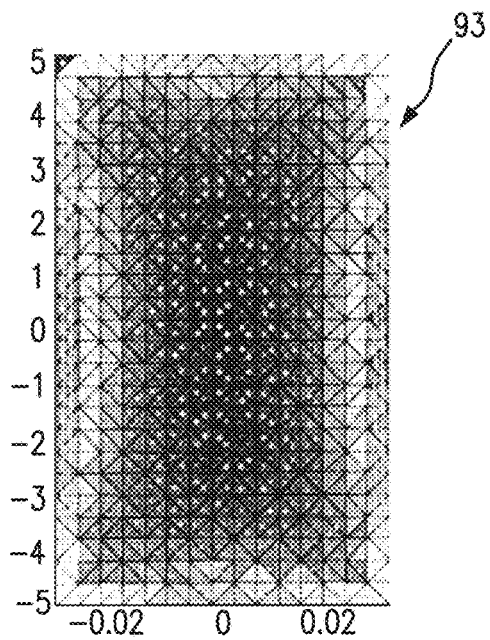
FIG. 11A is a current distribution diagram of an example embodiment of a primary radiator in the mobile wireless communications device in a third mode.
Figure 11B:
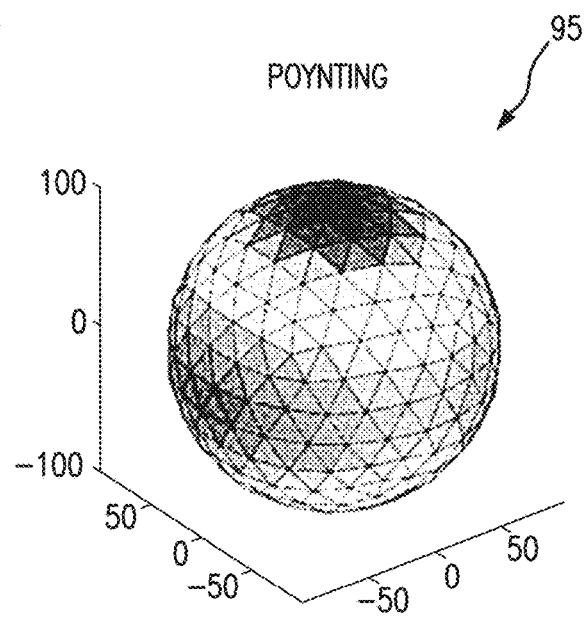
FIGS. 11B-11D are far field patterns of an example embodiment of a secondary radiator in the mobile wireless communications device in a third mode.
Figure 11C:
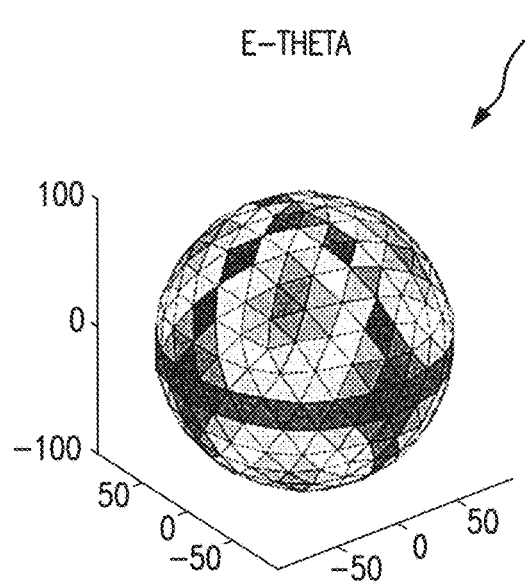
Figure 11D:
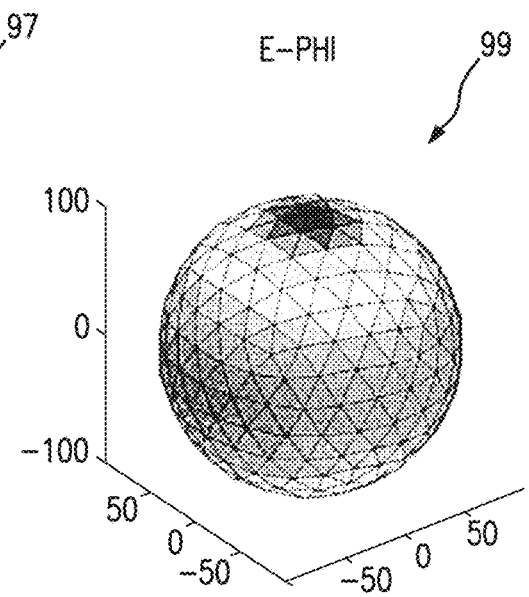

Referring now additionally to FIGS. 6-7, another embodiment of the multiple-band antenna 23" is now described. In this embodiment of the multiple-band antenna 23", those elements already discussed above with respect to FIGS. 1-3 are given double prime notation and most require no further discussion herein. This embodiment differs from the previous embodiment in that the third arm 47" includes the rectangle-shaped recess 64" in a medial portion rather than the corner of the embodiment of FIGS. 2-3. Also, the secondary radiator 25" has a general C-shape including the first and second arms 46", 34". The first arm 46" illustratively includes a pair of rectangle-shaped branches 115', 116'. The second arm 34" illustratively has an L-shape and is rectangle-shaped throughout. In the illustrated embodiment, the multi-band antenna 23" may operate the primary output 55" at: LTE Band 2, 4, 5, 17 Primary; WCDMA Band 1, 2, 5, 8 Primary; GSM 850, 900, 1800, 1900; and operate the secondary output 56" at: LTE Band 2, 4, 5, 17 MIMO; WCDMA Band 1, 2, 5, 8 Diversity.

With regards to the operating bands of the embodiments of FIGS. 2-7, the operating frequencies are shown in Table 1 herein.

TABLE 1

Operating Frequencies

| Band | Frequency Range (MHz) |
| --- | --- |
| LTE 17 | 704-746 |
| LTE 13 | 746-777 |
| LTE 20 | 791-862 |
| LTE/WCDMA 5 | 824-894 |
| GSM 850 | |
| CDMA 1x Cell | |
| LTE/WCDMA 8 | 880-960 |
| GSM 900 | |
| LTE 3 | 1710-1880 |
| LTE/WCDMA 4 Tx | |
| GSM 1800 | |
| LTE/WCDMA 2 | 1850-1990 |
| GSM 1900 | |
| CDMA 1x PCS | |
| WCDMA 1 | 1920-2170 |
| LTE7 | 2500-2690 |

Theory of Operation

The basis of this multiple-band antenna 23 relies on exciting different characteristics modes in the chassis of the mobile wireless communications device 20. Characteristics modes describe the current distribution and far field radiation that are unique to a given conducting body at a specific frequency. In theory, a metallic object could possess infinite number of characteristic mode for a given frequency, however not all modes are excitable in practice. Mathematically, characteristics modes on a metal object are precisely described by the following close boundary problem:

$$[L(J)-E]=0;$$

where the operator L is defined as $$L(J)=j\omega A(J)-\nabla\Phi(J); \text{ and}$$

A and $\Phi$ are the vector and scalar potentials due to a given current distribution respectively.

Since A and $\Phi$ are integrals defined over the closed surface, the problem can be rewritten in terms of impedances and arrive at the eigenvalues problem as $$Z(J)=L(J); \text{ and}$$

$$Z(J)=\nu M(J);$$

where matrix M is a symmetric matrix that diagonalizes the matrix Z, $\nu$ are the eigenvalues, and J are the eigenvectors. A characteristic mode refers to a given set of eigenvalue and eigenvector.

By definition, the eigenvectors associated with a particular conducting body are orthogonal to each other and must satisfy the orthogonality relationships $\langle J_m|ZJ_n\rangle=0$, for m≠n. In other words, the current distribution and radiation pattern of one mode is un-correlated to the current distribution and radiation pattern of another mode, even though there is only one radiating element. By exploiting this orthogonality principle of characteristic modes, the multiple-band antenna 23 can achieve low correlation at low frequencies despite having only one radiator and it is this particular property that enables this feature. More specifically, the first elongate member 32 in N-series excites a dominant mode 1 $(\nu_1,J_1)$ and the secondary radiator 25 excites a dominant mode 3 $(\nu_3,J_3)$.

Referring now to FIGS. 8-11D, diagram 77 shows the current distribution, and diagrams 79, 81, 83 show the far field patterns for the mobile wireless communications device 20 while in mode 1 at 704 MHz. Diagram 85 shows the current distribution, and diagrams 87, 89, 91 show the far field patterns for the mobile wireless communications device 20 while in mode 2 at 704 MHz. Diagrams 93, 70 show the current distribution, and diagrams 95, 97, 99 show the far field patterns for the mobile wireless communications device 20 while in mode 3 at 704 MHz.

The multiple-band antenna 23 may exploit the natural resonances, known as characteristics modes, of an arbitrary metallic object to achieve low correlation between multiple antennas in a MIMO system. Typical MIMO systems may rely on an antenna array where the antenna elements are usually separated from each other by half of a wavelength. For low frequency LTE bands, such as Band 17 (704 MHz-746 MHz) or Band 13 (746 MHz-777 MHz), the half wavelength spatial separation may not be achievable in handheld devices, such as a smartphone where the overall dimension of the device is on the order of a quarter wavelength of the operating wavelength. Low frequency is particularly interesting because radiation at low frequencies is predominantly due to the mobile device's chassis and the antenna element serves as an excitation element. Consequently, the current distributions excited by each antenna element in a MIMO system share one radiator, i.e. the chassis of the device. This is in conflict to the multi-antenna requirement of MIMO because multiple antennas usually mean that there are multiple radiating elements, which may not be true in a handset. The multiple-band antenna 23 may relax this requirement and enable: high performance MIMO with a single radiating element; and systematic antenna element placement with minimal correlation and gain imbalance.

With regards to Table 2 below, the measured performance of the multi-band antenna 23 in varying operating frequencies is shown. Of particular interest is the LTE MIMO and Correlation section, which demonstrate the low correlation values achieved with the multi-band antenna 23.

Example components of a mobile wireless communications device 1000 that may be used in accordance with the above-described embodiments are further described below with reference to FIG. 12. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 12:
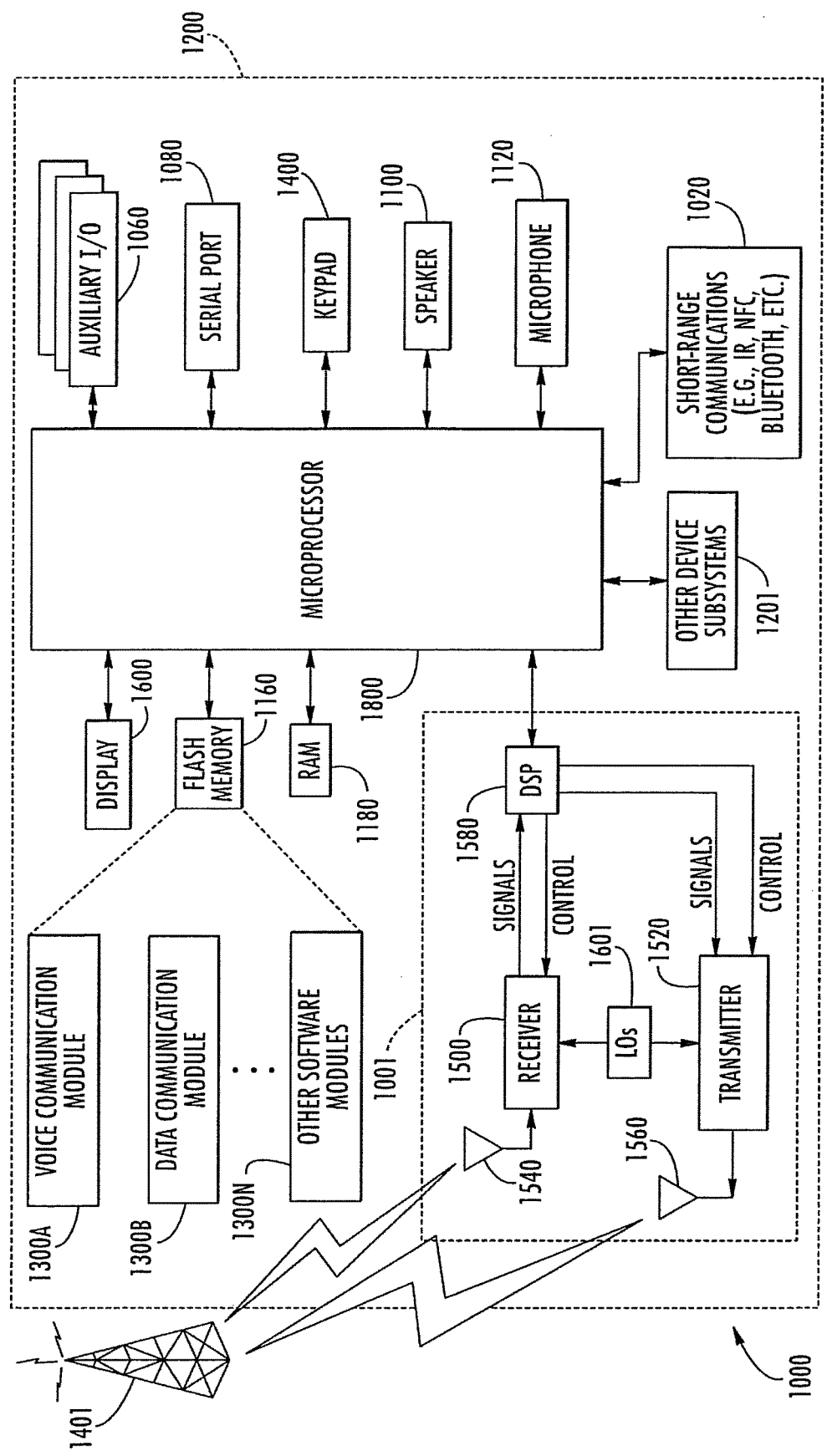
FIG. 12 is a schematic block diagram illustrating example components of a mobile wireless communications device that may be used with the mobile wireless communications device of FIG. 1.

In addition to the processing device 1800, other parts of the mobile device 1000 are shown schematically in FIG. 12. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a NFC sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

TABLE 2

Measured Performance
Verizon
LTE Rx Are 10 MHz BW

| Voice | Conducted Power | TRP | Required Gain | Measured Gain | | | Conducted Sensivity | T15 | | | | |
|---|---|---|---|---|---|---|---|---|---|---|---|---|
| Cell (FS) | 24 | 18 | −5 | −4.6 | −5 | −5.4 | −108 | −101 | | | | |
| | | | Margin | 1.4 | 1 | 0.6 | | | | | | |
| PCS (FS) | 24 | 19 | −5 | −5.1 | −4.8 | −4.9 | −107 | −101 | | | | |
| | | | Margin | −0.1 | 0.3 | 0.1 | | | | | | |

| EVDO | Conducted Power | TRP | Required Gain | Measured Gain | | | Conducted Sensivity | T15 | | | | |
|---|---|---|---|---|---|---|---|---|---|---|---|---|
| Cell (FS) | 24 | 18 | −5 | −4.6 | −5 | −5.4 | −109.5 | −102.5 | | | | |
| | | | Margin | 1.4 | 1 | 0.6 | | | | | | |
| PCS (F5) | 24 | 19 | −5 | −5.1 | −4.8 | −4.9 | −108.5 | −102.5 | | | | |
| | | | Margin | −0.1 | 0.3 | 0.1 | | | Margin | 0.8 | 0.3 | 0 |

| LTE | Conducted Power | TRP | Required Gain | Measured Gain | | | Conducted Sensivity | T15 | Required Gain | Measured Gain | | |
|---|---|---|---|---|---|---|---|---|---|---|---|---|
| Band 13 | 23.5 | 18 | −5.5 | −5.2 | −5 | −5.5 | −98.5 | −91 | −7.5 | −6.6 | −6.3 | −5.8 |
| | | | Margin | 0.3 | 0.5 | 0 | | | Margin | 0.9 | 1.2 | 1.6 |
| Band 4 | 23.5 | 19 | −4.5 | −4.3 | −3.8 | −3.8 | −97 | −91 | −6 | −4.1 | −4.3 | −4.7 |
| | | | Margin | 0.2 | 0.7 | 0.7 | | | Margin | 1.9 | 1.7 | 1.3 |

| LTE MIMO | | | | | | | Conducted Sensivitity | T15 | Required Gain | Measured Gain | | | Delta with Primary | | |
|---|---|---|---|---|---|---|---|---|---|---|---|---|---|---|---|
| Band 13 | | | | | | | −98.7 | −88 | −10.7 | −9.8 | −9.7 | −9.3 | 3.2 | 3.4 | 3.6 |
| | | | | | | | | | Margin | 0.9 | 1 | 1.4 | | | |
| Band 4 | | | | | | | −97 | −88 | −9 | −9 | −7.9 | −7.3 | 4.9 | 3.6 | 2.6 |
| | | | | | | | | | Margin | 0 | 1.1 | 1.7 | | | |
| Correlation | | | | | | | | | Required | Measured | | | | | |
| Band 13 | | | | | | | | | 0.5 | 0.33 | 0.32 | 0.32 | | | |
| | | | | | | | | | Margin | 0.17 | 0.18 | 0.18 | | | |
| Band 4 | | | | | | | | | 0.5 | 0.06 | 0.07 | 0.06 | | | |
| | | | | | | | | | Margin | 0.44 | 0.43 | 0.44 | | | |

| Diversity | | | | | | | Conducted Sensivity | T15 | Required Gain | Measured Gain | | | Delta with Primary | | |
|---|---|---|---|---|---|---|---|---|---|---|---|---|---|---|---|
| Cell (F5) | | | | | | | −108 | −95 | −13 | −9.2 | −9.3 | −9.3 | 3.8 | 4.1 | 4 |
| PCS (F5) | | | | | | | −107 | −95 | −12 | −3.7 | −3.9 | −3.6 | 1.5 | 1.9 | 2.4 |
| | | | | | | | | | Margin | 8.3 | 8.1 | 8.4 | | | |

That which is claimed is:

1. A mobile wireless communications device comprising:
a housing;
at least one wireless transceiver carried by the housing and having a primary output, and a secondary output; and
a multiple-band Multiple Input Multiple Output (MIMO) antenna carried by the housing and coupled to the at least one wireless transceiver, the multiple-band MIMO antenna comprising:
a primary radiator and a secondary radiator, wherein the primary radiator comprises a conductive first elongate member and a conductive first reference member spaced from the first elongate member, the first reference member coupled to a reference voltage and partially surrounding the first elongate member, the first elongate member of the primary radiator having a primary feed coupled to the primary output, the secondary radiator having a secondary feed coupled to the secondary output, wherein the primary radiator excites a first signal associated with a first dominant mode, and wherein the secondary radiator excites a second signal associated with a different other dominant mode for a given operating frequency, wherein the primary radiator and the second radiator have a spacing therebetween, wherein the spacing achieves a low correlation between the first signal and the second signal.

2. The mobile wireless communications device of claim 1, wherein a current distribution and radiation pattern of the primary radiator is un-correlated to a current distribution and radiation pattern of the secondary radiator.

3. The mobile wireless communications device of claim 1, wherein the multiple-band MIMO antenna comprises a dielectric substrate and a pattern of electrically conductive traces thereon defining the primary and secondary radiators.

4. The mobile wireless communications device of claim 1, wherein the secondary radiator comprises a second elongate member.

5. The mobile wireless communications device of claim 1, wherein the multiple-band MIMO antenna comprises a dielectric substrate and a pattern of electrically conductive traces thereon defining the primary and secondary radiators, wherein the first reference member comprises a U-shape defining an inner space, and wherein a portion of the first elongate member is positioned in the inner space.

6. The mobile wireless communications device of claim 4, wherein the first reference member comprises a first arm, and a second arm perpendicularly coupled thereto, wherein the first arm has an L-shape, and wherein the second arm comprises a proximal portion coupled to the first arm and having an L-shape, and a distal portion extending away from the proximal portion.

7. The mobile wireless communications device of claim 6, wherein the second elongate member has a first arm, and a second arm coupled thereto, wherein the secondary feed is on the second arm, and wherein the first arm extends at least partially along a bottom edge of the housing.

8. The mobile wireless communications device of claim 4, wherein the first reference member comprises a first arm that extends along a bottom of the housing.

9. The mobile wireless communications device of claim 3, wherein the dielectric substrate has a non-planar shape.

10. The mobile wireless communications device of claim 3, wherein the dielectric substrate is carried by a bottom of the housing.

11. The mobile wireless communications device of claim 3, wherein the primary and secondary radiators are carried by respective opposing first and second sides of the dielectric substrate.

12. The mobile wireless communications device of claim 1, wherein the at least one wireless transceiver comprises a Long Term Evolution (LTE) transceiver configured to operate the primary and secondary outputs in an LTE carrier aggregation mode.

13. The mobile wireless communications device of claim 1, wherein the low correlation is less than a required correlation provided by Long Term Evolution (LTE) standards.

14. A multiple-band Multiple Input Multiple Output (MIMO) antenna for a mobile wireless communications device comprising a housing, and at least one wireless transceiver carried by the housing, the multiple-band MIMO antenna comprising:
   a primary radiator and a secondary radiator, wherein the primary radiator comprises a conductive first elongate member and a conductive first reference member spaced from the first elongate member, the first reference member coupled to a reference voltage and partially surrounding the first elongate member,
   the first elongate member of the primary radiator having a primary feed coupled to a primary output, the secondary radiator having a secondary feed coupled to a secondary output, wherein the primary radiator excites a first signal associated with a first dominant mode, and wherein the secondary radiator excites a second signal associated with a different other dominant mode for a given operating frequency, wherein the primary radiator and the second radiator have a spacing therebetween, wherein the spacing achieves a low correlation between the first signal and the second signal.

15. The multiple-band MIMO antenna of claim 14, wherein a current distribution and radiation pattern of the primary radiator is un-correlated to a current distribution and radiation pattern of the secondary radiator.

16. The multiple-band MIMO antenna of claim 14, further comprising:
   a dielectric substrate and a pattern of electrically conductive traces thereon defining the primary radiator and the secondary radiator.

17. The multiple-band MIMO antenna of claim 16, wherein the dielectric substrate has a non-planar shape.

18. The multiple-band MIMO antenna of claim 16, wherein the primary and secondary radiators are carried by respective opposing first and second sides of the dielectric substrate.

19. The multiple-band MIMO antenna of claim 14, wherein the first reference member comprises a U-shape defining an inner space, wherein a portion of the first elongate member is positioned in the inner space.

20. The multiple-band MIMO antenna of claim 14, wherein the first reference member comprises a first arm, and a second arm perpendicularly coupled thereto, wherein the first arm has an L-shape, and wherein the second arm comprises a proximal portion coupled to the first arm and having an L-shape, and a distal portion extending away from the proximal portion.

* * * * *